Jan. 31, 1967   W. V. WILLIAMS   3,301,735
APPARATUS FOR SPLICING SYNTHETIC THERMOPLASTIC YARNS
Filed March 4, 1964   3 Sheets-Sheet 1

INVENTOR.
WILLIE V. WILLIAMS
BY
ATTORNEY

Jan. 31, 1967    W. V. WILLIAMS    3,301,735
APPARATUS FOR SPLICING SYNTHETIC THERMOPLASTIC YARNS
Filed March 4, 1964    3 Sheets-Sheet 2

INVENTOR.
WILLIE V. WILLIAMS
BY
ATTORNEY

Jan. 31, 1967  W. V. WILLIAMS  3,301,735
APPARATUS FOR SPLICING SYNTHETIC THERMOPLASTIC YARNS
Filed March 4, 1964  3 Sheets-Sheet 3
FIG. 7
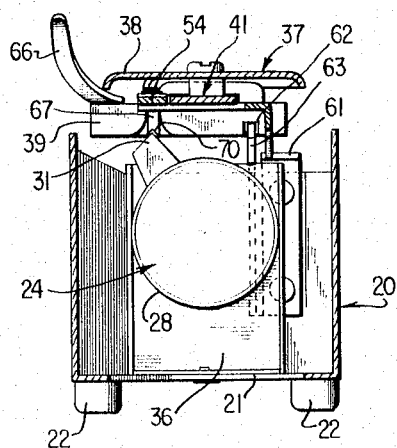
FIG. 8
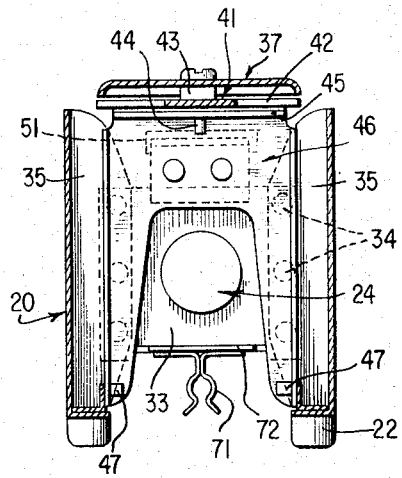
FIG. 9
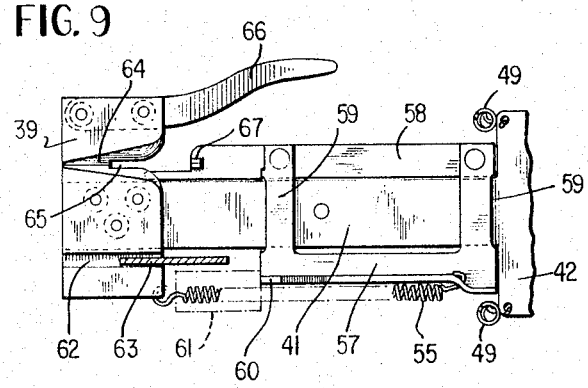
FIG. 10
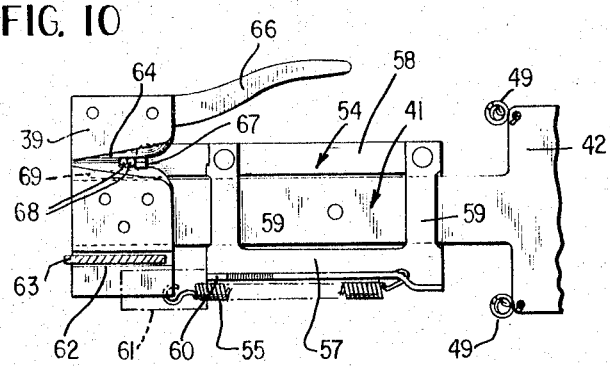
FIG. 11
INVENTOR.
WILLIE V. WILLIAMS
BY
B. P. Fishburne Jr.
ATTORNEY

United States Patent Office
3,301,735
Patented Jan. 31, 1967

3,301,735
APPARATUS FOR SPLICING SYNTHETIC THERMOPLASTIC YARNS
Willie Vincent Williams, 708 Green St., P.O. Box 687, Dalton, Ga. 30720
Filed Mar. 4, 1964, Ser. No. 349,435
6 Claims. (Cl. 156—433)

This invention relates broadly to electrical heating apparatus and more particularly to apparatus for splicing thermoplastic synthetic yarns and the like.

This application is a continuation-in-part of my prior copending application Serial Number 257,968, filed Feb. 12, 1963, for Apparatus for Splicing Thermoplastic Synthetic Yarns, now Patent No. 3,160,547.

Basically, the apparatus disclosed herein represents a refinement of and improvement upon the apparatus disclosed in the aforementioned parent application, and the objectives of this invention are generally the same as those set forth in application Serial Number 257,968.

The improved apparatus is lightweight and designed for economical mass production utilizing die formed sheet metal parts and the like. Additionally, the improved apparatus has a self-cleaning feature to be described, not present in the original form of the same disclosed in said parent application. Various advantages of the improved structure herein will be readily apparent to those skilled in the art during the course of the following detailed description, taken in light of the disclosure in the mentioned prior application Serial Number 257,968.

Figure 1:
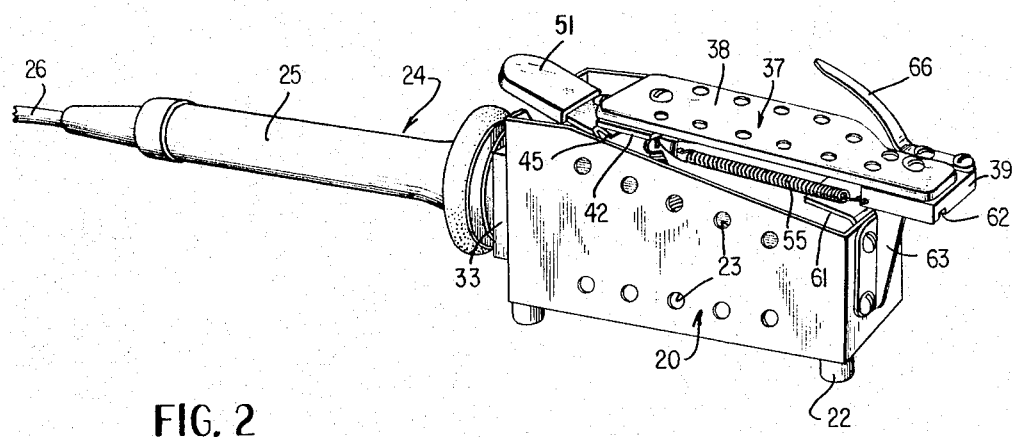
Figure 2:
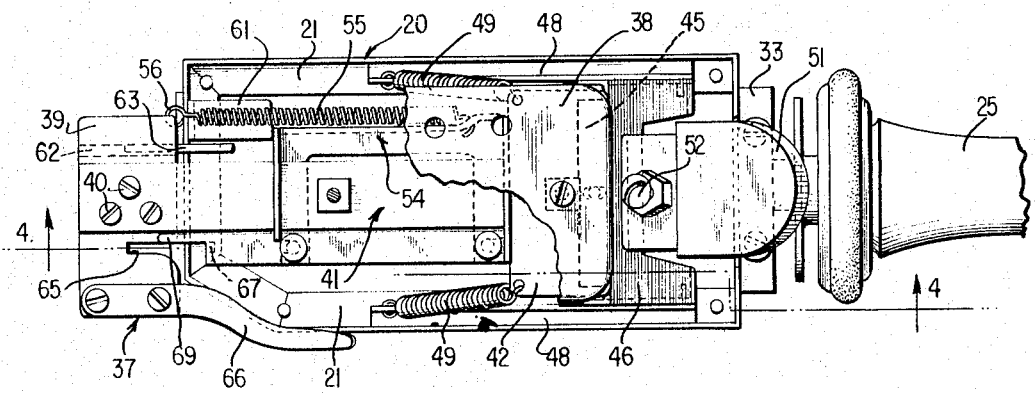
Figure 3:
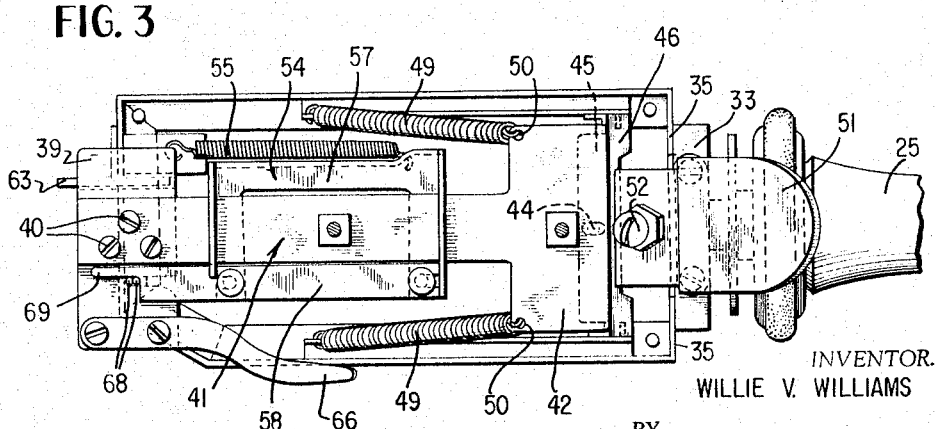
Figure 4:
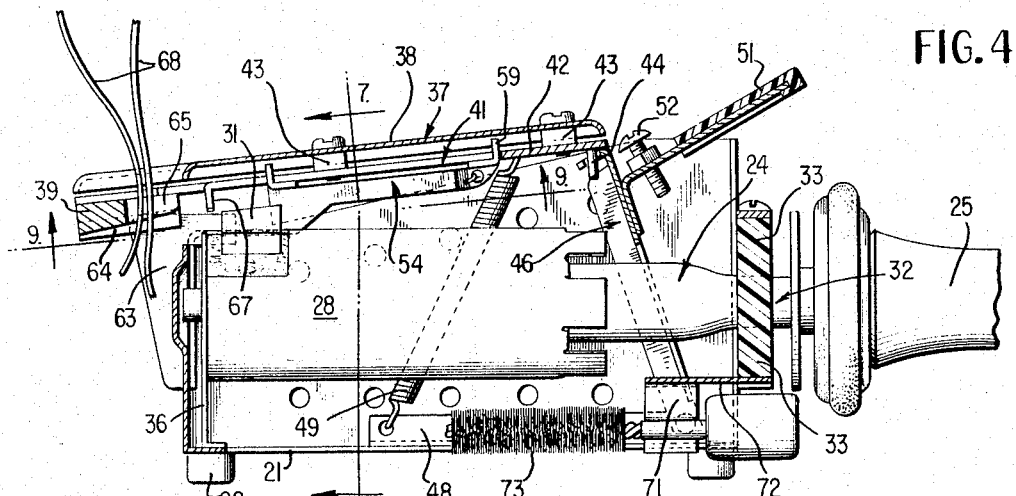
Figure 5:
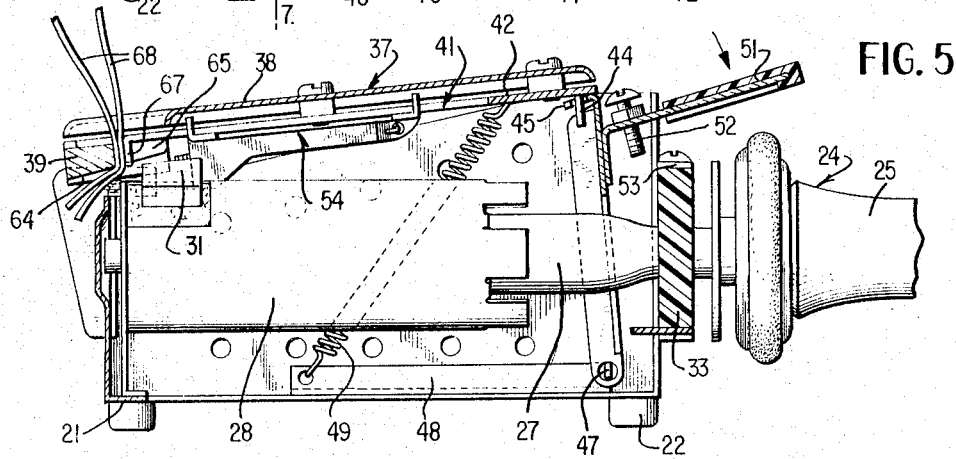
Figure 6:
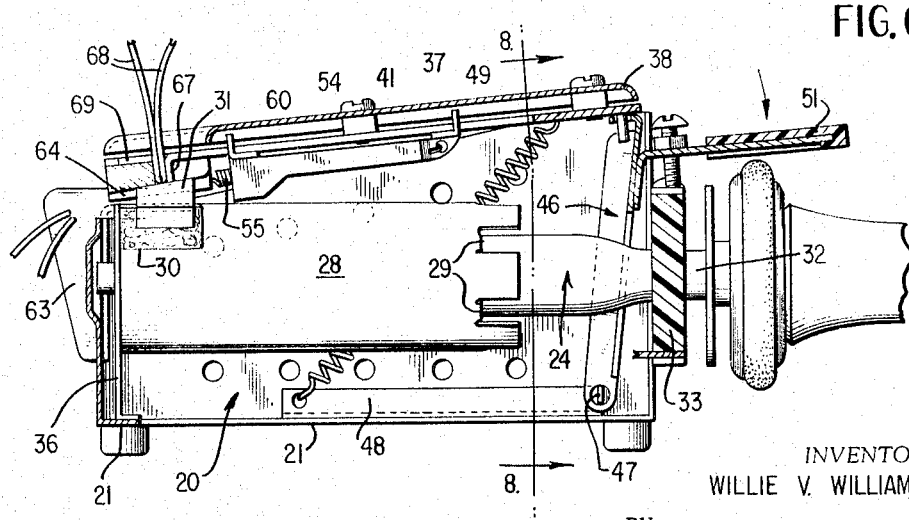

In the accompanying drawings forming a part of this application and in which like numerals are employed to designate like parts throughout the same, FIGURE 1 is a perspective view of a synthetic yarn splicing apparatus embodying the invention, FIGURE 2 is a somewhat enlarged fragmentary plan view of the apparatus with parts broken away and parts omitted, FIGURE 3 is a plan view similar to FIGURE 2 but showing certain components of the apparatus in intermediate operating positions, FIGURE 4 is a longitudinal vertical section taken substantially on line 4—4 of FIGURE 2, FIGURE 5 is a similar view with the operating parts positioned to correspond with the showing in FIGURE 3, FIGURE 6 is a similar view with the parts positioned in a third and final operating position, FIGURE 7 is a transverse vertical section taken on line 7—7 of FIGURE 4, FIGURE 8 is a similar view taken on line 8—8 of FIGURE 6, FIGURE 9 is a fragmentary bottom plan view of a head or anvil assembly in one adjusted position thereof, corresponding to FIGURE 2, FIGURE 10 is a similar view with the parts arranged in the manner shown in FIGURES 3 and 5, and FIGURE 11 is an enlarged side elevational view of a synthetic yarn splice produced by the apparatus.

In the drawings, wherein for the purpose of illustration is shown a preferred embodiment of the invention, the portable synthetic yarn splicing apparatus shown comprises a base or housing 20 formed of sheet metal and being essentially open at its top and bottom but having an inturned relatively narrow horizontal flange 21 at its bottom for the sake of rigidity and for the anchoring of certain elements to be described. The horizontal flange 21 extends continuously about the two longitudinal sides and the forward end of housing 20 but is interrupted at the rear end of the housing. The base or housing 20 may be equipped with suitable short supporting feet 22 of plastic material or some other suitable heat insulating material. The side walls of the housing 20 are preferably apertured as at 23 to aid in ventilating the interior of the housing.

The apparatus further embodies a heating assembly 24 of the electrical type and being generally conventional insofar as mode of operation is concerned. The assembly 24 comprises a handle 25 covered externally with heat insulating material and preferably containing an automatically operating magnastat or thermostat switch, not shown, to regulate the degree of heat produced by the apparatus. No manually operable "on" and "off" or control switch is employed or required and all the user need do is plug the apparatus into any standard 110 volt A.C. power outlet. An electric cord or cable 26 leads from the handle 25 and may be of any preferred length and is equipped at its free end, not shown, with a suitable plug or plug with adapter.

The assembly 24 further embodies a heating iron body portion 27 which may be cylindrical and surrounded by a sheet metal heat shield 28 suitably anchored thereto as at 29 and preferably containing heat insulating material of the fibrous type. The shield 28 is notched at 30 near its forward end for the projection radially of a heating shoe or stationary anvil 31 forming an important element of the invention. The shoe 31 is secured by brazing or welding to the heating iron 27 proper but is fabricated separately from the heating iron and accurately shaped prior to mounting on the heating iron. In my mentioned prior copending application, the heating shoe or stationary anvil was not formed as a separate element and this feature constitutes an important improvement and an economy over the apparatus in the parent application.

As shown in the drawings, the neck 32 of the heating assembly 24 is suitably anchored within a mounting block 33 of plastic, Bakelite or the like, in turn rigidly secured by riveting at 34 to the back flanges 35 of sheet metal housing 20. The forward end of the heating assembly 24 is suitably supported and stabilized by a sheet metal bracket structure 36 within the forward portion of housing 20 and suitably anchored to the lower flange 21. Other details of the heating assembly 24 are not important to the present invention or a proper understanding thereof.

A significant difference between the present invention structure thus far described and that of the aforementioned application resides in the improved construction of the base or housing 20. Another important difference or refinement resides in the much more compact and lightweight nature of the heating assembly 24 with the separately fabricated accurately formed heat shoe 31, to be further described, and the insulating heat shield 28, absent in the parent application.

The apparatus further comprises a movable slide or head assembly 37 having a removable apertured sheet metal cover plate 38. The assembly 37 further comprises an anvil 39 for coaction with the shoe 31, partially underlying the cover plate 38 and secured rigidly at 40 to the bottom face of an elongated slide 41 having a rear crosshead 42 integral therewith. The cover plate 38 is spaced from the anvil 39 and slide 41 by suitable spacer elements 43, as shown. The crosshead 42 is equipped at its transverse center with a depending swivel pin 44 rigid therewith having a swiveled connection with an apertured top flange 45 of a vertically swingable yoke 46 formed of sheet metal. The yoke 46 is bifurcated as shown to straddle the heating iron 27 in a highly compact manner and the lower ends of the legs or sides of the yoke are rockably secured at 47 to brackets 48, suitably rigidly secured to the housing flange 21. The brackets 48 also serve to anchor the lower ends of relatively heavy retractile coil springs 49 whose upper ends are secured at 50 to the crosshead 42. The springs 49 serve to bias the assembly 37 forwardly and downwardly relative to the housing 20 and heating assembly 24.

An insulated lever extension 51 operated by the thumb of the hand grasping the handle 25 is secured to the back of swingable yoke 46 near the top thereof and has an adjustable stop screw 52 engageable with a plate 53 on the bakelite block 33 to positively limit the downward movement of the lever 51 and the retraction of the head assembly 37, see FIGURE 6.

The assembly 37 further comprises a yarn clamping slide structure 54 movably mounted upon the main head slide 41 and urged forwardly by a retractile spring 55 having its rear end secured to the slide 54 and its forward end secured to the anvil 39 as at 56. The slide structure 54 includes longitudinal sides 57 and 58 and crossbars 59 having slots slidably receiving the main slide 41. Forward movement of the main slide and its crosshead 42 is limited by contact between the crosshead 42 and the rear member 59 of slide 54 as best shown in FIGURE 4. In a like manner, forward movement of the slide 54 is arrested by engagement of a side depending projection 60 thereof with a stop element 61 secured rigidly to the inner face of the forward wall of housing 20. It should be understood that both the main slide 41 and also the clamping slide 54 are movable in unison relative to the housing and heating assembly 24, and these two slides may also have relative longitudinal movement as will be described.

In order to positively guide the entire head assembly 37 longitudinally, the bottom face of anvil 39 is grooved at 62 near one side thereof for the reception of a vertical guide element 63, rigidly secured to the forward end of housing 20. Near its opposite side, the anvil 39 is provided in its bottom face with a forwardly tapering inverted V-shaped groove 64 having side walls which preferably form an included angle of about 90 degrees. The groove 64 is smooth surfaced and accurately formed. The anvil 39 has a yarn receiving slot 65 formed therethrough at the center of the groove 64 and terminating near the longitudinal center of the tapered groove in the bottom face of the anvil. A suitable guide 66 for assisting in introducing the yarn ends into the slot 65 is rigidly mounted upon the adjacent side of anvil 39, as shown.

At the forward end of the side 58 of slide 54, the same carries a depending yarn clamping finger 67 adapted to move into the slot 65 of the anvil and to clamp the yarn ends 68 against the closed end of the slot 65, FIGURES 6 and 10. The slide 54 also has a longitudinal finger extension 69 which engages slidably over the top face of anvil 39 and completes the guide passage for the yarn entering the slot 65 when the parts are arranged in the non-clamping position, FIGURE 2. The yarn clamping finger 67 has a small V-shaped sharply defined notch 70, FIGURE 7, in its lower end slidably engaging the sharp angular corner of the accurately formed heating shoe 31 for the purpose of scraping or cleaning the shoe continuously during the use of the apparatus. That is to say, when the apparatus is continuously used to fuse or splice synthetic yarns there may accumulate some deposits on the shoe 31 and the notch clamping finger 67 will clean these deposits away.

There is provided a spring clip 71 depending from a bracket plate 72 rigidly secured to the bottom of the block 33, FIGURE 4, the purpose of which clip being to releasably hold a cleaning brush 73 having copper wire bristles. The brush may be utilized to clean thoroughly the anvil groove 64 and the faces of the heating shoe 31 and other parts which require cleaning. The brush is held at the bottom of the housing 20 in an out-of-the-way concealed location, FIGURE 4.

It might be mentioned here in connection with the servicing and cleaning of the apparatus that the forward end of the head assembly 37, when the parts are arranged as in FIGURES 3 and 5, is readily liftable from the assembly 24 and housing by pivoting on the loose connection between the pin 44 and apertured flange 45. That is to say, the entire assembly 37 may be pivoted upwardly and swung to one side of the apparatus by pivoting on the pin 44, and the springs 49 will yield sufficiently to allow this. This will readily expose the bottom of the anvil 39 for cleaning and the top of the shoe 31 and these are the most critical parts. The entire apparatus can be further taken apart, if required, without any difficulty.

The use or operation of the apparatus is basically identical with the operation described in the aforementioned application Serial Number 257,968 and need not be repeated in great detail herein.

Briefly, with the parts arranged as in FIGURES 1, 2 and 4, the assembly 37 is in the forwardmost position relative to the housing 20 and heating assembly 24 and the anvil 39 is separated fully from the shoe 31, see FIGURE 4. The yarn ends 68 are now passed into the passage afforded by the elements 66 and 69 and the yarn ends finally enter the slot 65 of the anvil 39, as shown in FIGURE 4, for example.

With the yarn ends so positioned, the thumb lever 51 is depressed by the user as shown in FIGURES 5 and 6, it being understood that the heating shoe 31 is suitably hot at this time. Depression of the lever 51 causes the main slide 41 including the anvil 39 to shift rearwardly, FIGURE 5, but initially the clamping slide 54 remains stationary or held forwardly under influence of retractile spring 55 and contact is maintained between the elements 60 and 61. When the parts reach the relative positions shown in FIGURE 5 and also in FIGURES 3 and 10, the yarn ends 68 become clamped between the forward end of the slot 65 and the finger 67 of secondary slide 54. At this time, the downwardly opening groove 64 of the anvil 39 is just beginning to approach and overlie the upwardly tapering shoe 31 but has not yet made positive contact with the same, FIGURE 5.

Further and final depression of the thumb lever 51 to the limit of its travel, FIGURE 6, causes the secondary slide 54 and the main slide 41 carrying the anvil to shift rearwardly as a unit, further stretching the springs 49. The secondary slide 54 is caused to move rearwardly because the finger 67 is in positive engagement with the yarn in the groove 65 and the action of the spring 55 is nullified since both ends of the spring are attached to the overall slide structure which now moves rearwardly as a unit.

When this occurs, FIGURE 6, the yarn ends 68 are drawn rearwardly toward the shoe 31 and the inverted V-shaped groove 64 of anvil 39 passes over the shoe and enters into sliding interfitting engagement therewith, in the manner fully explained in said prior application. The yarn ends 68 are subjected to a shearing action and are severed, FIGURE 6, when the forward closed end of slot 65 passes rearwardly over the heating shoe 31. The rubbing engagement of the anvil 39 with the heating shoe 31 while the yarn ends are clamped to the anvil causes fusion of the severed yarn ends to produce a splice in the nature of a "butt weld" as indicated at 74 in FIGURE 11. Again, this mode of operation is described in my prior application Serial Number 257,968.

It should be noted that the groove 64 tapers forwardly and also increases in depth gradually toward the rear of anvil 39 and toward the open end of slot 65. The angle included between the side walls of groove 64 may be a constant approximately 90 degree angle throughout the length of the groove 64. The active corner of the heating shoe 31 is also substantially square or 90 degrees and the shoe 31 is not tapered in the manner of the groove 64 but does have its upper active corner inclined somewhat upwardly and rearwardly as shown in FIGURES 4–6.

As explained in said prior application, the relationship of the anvil 39 and its groove 64 to the accurately formed shoe 31 and the related yarn clamping slot 65 and clamping finger 67 form the essence of the invention and the most critical parts of the apparatus. The coaction among these parts remains essentially the same as in said prior application although the mechanism is considerably refined and improved upon.

As previously mentioned, the notch 70 of finger 67 serves to clean the active corner of shoe 31 during reciprocation of the head assembly 37 and removes any accumulated deposits from the shoe.

Upon release of the thumb lever 51 by the operator, the parts return automatically under influence of the springs to their relative positions shown in FIGURES 2 and 4 and the spliced yarn is released.

In view of the description and disclosure in application Serial Number 257,968 which is incorporated herein by reference, it is believed that no further description should be required herein for a proper understanding of the improved structure defined by the subjoined claims.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. An electrically operated synthetic yarn splicing apparatus comprising a housing and support unit having side walls and being open at the top and bottom thereof, an electrical heating iron assembly including a handle portion mounted upon the housing and support unit, said heating iron assembly including a separately formed heating shoe having a substantially square corner within the housing unit, a shiftable head assembly substantially covering the top of the housing unit and movable longitudinally relative thereto and including an anvil having a groove for coaction with said shoe and a slot for receiving yarn ends, a main slide carrying said anvil, a yoke pivoted to the housing unit near the lower rear corner thereof and disposed within the housing unit and having its top pivotally secured to the main slide, a thumb lever on said yoke projecting exteriorly of the housing unit, resilient means interconnecting the housing unit and main slide serving to bias the shiftable head assembly forwardly and downwardly relative to the housing unit, an auxiliary slide on the main slide and bodily carried thereby and having a yarn clamping part adapted to enter the slot of said anvil, a spring interconnecting the auxilary slide and said anvil and urging the auxiliary slide forwardly relative to the main slide, and a stop element on the housing unit to arrest the forward movement of the auxilary slide.

2. The invention as defined by claim 1, and wherein said housing and support unit comprises a unitary sheet metal structure having an inturned marginal flange at its bottom, and supporting feet secured to the bottom face of said flange.

3. The invention as defined by claim 1, and wherein said yoke is bifurcated and includes legs which straddle said heating iron assembly within said housing unit.

4. Synthetic yarn splicing apparatus comprising a heating iron assembly having a handle portion and a heating shoe including a substantially square corner, a housing substantially surrounding the heating iron assembly with the handle portion of said assembly projecting outside of the housing, the housing being open at its top and bottom, a mounting block element interconnecting the heating iron assembly with the rear end of the housing so that the housing bodily supports the heating iron assembly, bracket means interconnecting the forward end of the housing to the forward end of the heating iron assembly, a shiftable head assembly above the heating iron assembly and housing and substantially covering the open top of the latter, a rockable yoke pivoted to the rear end of the head assembly and to the housing near its rear lower corner and disposed within the housing, an operating lever extension secured to said yoke and projecting rearwardly of the housing, an anvil on said head assembly having a groove for cooperation with the heating shoe and a yarn receiving slot leading into said groove, said anvil having an additional guide groove in its bottom face, an upstanding guide element on said housing engaging slidably in said guide groove, and resilient means interconnecting the head assembly and housing and urging the head assembly forwardly with respect to the housing.

5. Apparatus for splicing thermoplastic yarn comprising an electrical heating iron assembly having a handle portion and a heating iron body portion including a heating shoe, a sheet metal housing secured to and substantially surrounding the heating iron body portion with the handle portion projecting exteriorly of the housing, a rockable yoke within the rear portion of the housing and having a thumb lever extension projecting rearwardly of the housing, an anvil slide structure pivoted to the top of the yoke and extending forwardly thereof and having sliding guided engagement with the housing, spring means urging said slide structure forwardly and downwardly with respect to the housing, and resilient yarn clamping means on said anvil slide structure.

6. The invention as defined by claim 5, and a nonmetallic electrical and heat insulating block secured to the housing and to the heating iron assembly and adapting the latter to the housing.

No references cited.

EARL M. BERGERT, *Primary Examiner.*